(12) United States Patent
Ozue

(10) Patent No.: US 6,657,807 B1
(45) Date of Patent: Dec. 2, 2003

(54) MAGNETIC RECORDING/PLAYBACK APPARATUS AND METHOD

(75) Inventor: Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 376 days.

(21) Appl. No.: 09/697,702

(22) Filed: Oct. 26, 2000

(30) Foreign Application Priority Data

Oct. 26, 1999 (JP) ............................................ P11-304620

(51) Int. Cl.⁷ ...................... G11B 15/18; G11B 17/00; G11B 19/02
(52) U.S. Cl. ........................................................ 360/72.1
(58) Field of Search .............................. 360/72.2, 72.1, 360/72.3, 71, 48

(56) References Cited

U.S. PATENT DOCUMENTS 6,084,740 A * 7/2000 Leonhardt et al. ........ 360/78.02
6,215,613 B1 * 4/2001 Arris et al. ................. 360/96.5
6,297,927 B1 * 10/2001 Rudi ............................ 360/95

* cited by examiner

Primary Examiner—David Hudspeth
Assistant Examiner—Mitchell Slavitt
(74) Attorney, Agent, or Firm—Sonnenschein, Nath & Rosenthal LLP

(57) ABSTRACT

There is provided a magnetic tape recorder/player for writing and/or reading an information signal to and/or from a magnetic tape encased in a two-reel type tape cartridge. The apparatus includes a magnetic head dedicated for writing or reading information on the position of the magnetic tape to or from the magnetic tape, and the tape cartridge has formed therein an opening in a position where the opening will be vis-a-vis to the position information-dedicated magnetic head when the tape cartridge is set in place in the magnetic tape recorder/player.

8 Claims, 4 Drawing Sheets

MAGNETIC RECORDING/PLAYBACK APPARATUS AND METHOD

BACKGROUND OF THE INVENTION

1. Field of the Invention

The present invention relates to a magnetic recording/playback apparatus and method, and more particularly, to a magnetic recording/playback apparatus and magnetic tape write/read method, in which high-speed access to a magnetic tape is possible.

2. Description of the Related Art

Recently, mini computers, office computers such as personal computers, etc. have been used more and more widely. Along with this tendency, the researches on the magnetic tape as an external storage medium for recording computer data, the so-called tape streamer, have been done actively. For the development of a magnetic tape for actual use in such an application, the magnetic tape should have a larger storage capacity and a smaller size correspondingly to an increased processing capability and smaller design of such computers.

On the other hand, the magnetic recording medium for use as a video cassette should desirably have a smaller size corresponding to the smaller design of the video cassette as well as a capability of longer-time recording.

For an improved recording capacity and longer time of recording required for the digital-recording magnetic tapes such as the tape streamer and video cassette, it is essential for the tape to be accessible at a high speed and the high-speed access is required for information management of the magnetic tape.

Generally, a signal is written to or read from the above-mentioned magnetic tape by a magnetic recorder/player having a rotary head composed of magnetic heads installed on a rotary drum. For writing or reading information signal to or from the magnetic tape, it is necessary to manage the position of the magnetic tape for the purpose of information management. The magnetic tape position is managed by reading position information such as addresses recorded in the magnetic tape.

Conventionally, position information such as addresses in the magnetic tape is acquired as follows. Namely, the magnetic tape is set in the magnetic recorder/player and loaded in place, and then position information is written in a data format or address information recorded in a data format is read. Alternatively, the magnetic tape is set in the magnetic recorder/player and then the reel speed is counted before the magnetic tape is loaded in place.

However, if the former one of the conventional methods for acquisition of position information in the magnetic tape is adopted, it is necessary to load the magnetic tape in place, which will take a time. When the magnetic tape is fast forwarded or rewound at a high speed with the magnetic tape loaded in place, it will be deteriorated. That is, the magnetic tape may not be fast forwarded or rewound at any high speed. In case of the latter method, the magnetic tape position cannot be controlled with a high accuracy.

OBJECT AND SUMMARY OF THE INVENTION

It is therefore an object of the present invention to overcome the above-mentioned drawbacks of the prior art by providing a magnetic tape recording/playback apparatus and method, in which a high-speed access is possible to the magnetic tape without any deterioration of the latter.

The above object can be attained by providing a magnetic tape recording/playback apparatus for writing and/or reading an information signal to and/or from a magnetic tape encased in a two-reel type tape cartridge, the apparatus including according to the present invention;

a magnetic head dedicated for writing or reading information on the position of the magnetic tape to or from the magnetic tape;

the tape cartridge having formed therein an opening for said information-dedicated magnetic head in a position where the opening will be corresponding to the position information-dedicated magnetic head when the tape cartridge is set in place in the magnetic tape recording/playback apparatus.

In the above magnetic tape recording/playback apparatus, the position information-dedicated magnetic head is provided to write or read magnetic tape position information to or from the magnetic tape. The opening formed in the tape cartridge is located in a position where it will be vis-a-vis to the position information-dedicated magnetic head when the tape cartridge is set in place in the magnetic tape recording/playback apparatus.

Therefore, in the magnetic tape recording/playback apparatus according to the present invention, the magnetic tape position information is written or read by the position information-dedicated magnetic head to or from the magnetic tape being unloaded.

Also the above object can be attained by providing a magnetic tape recording/playback method for writing and/or reading an information signal to and/or from a magnetic tape encased in a two-reel type tape cartridge by a magnetic tape recording/playback apparatus, the method including, according to the present invention, steps of;

setting the tape cartridge in the magnetic tape recording/playback apparatus;

placing a magnetic head dedicated for writing or reading information on the position of the magnetic tape in a position where the position information-dedicated magnetic head will be put into contact with the magnetic tape being unloaded in place; and writing and/or reading the magnetic tape position information to and/or from the magnetic tape.

In the above magnetic tape recording/playback method, the position information-dedicated magnetic head is put into contact with the magnetic tape being unloaded in the magnetic tape recording/playback apparatus, and the magnetic tape position information is written and/or read from the magnetic tape.

Therefore, in the magnetic tape recording/playback method according to the present invention, the magnetic tape position information is written or read by the position information-dedicated magnetic head from or to the magnetic tape being unloaded in place.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
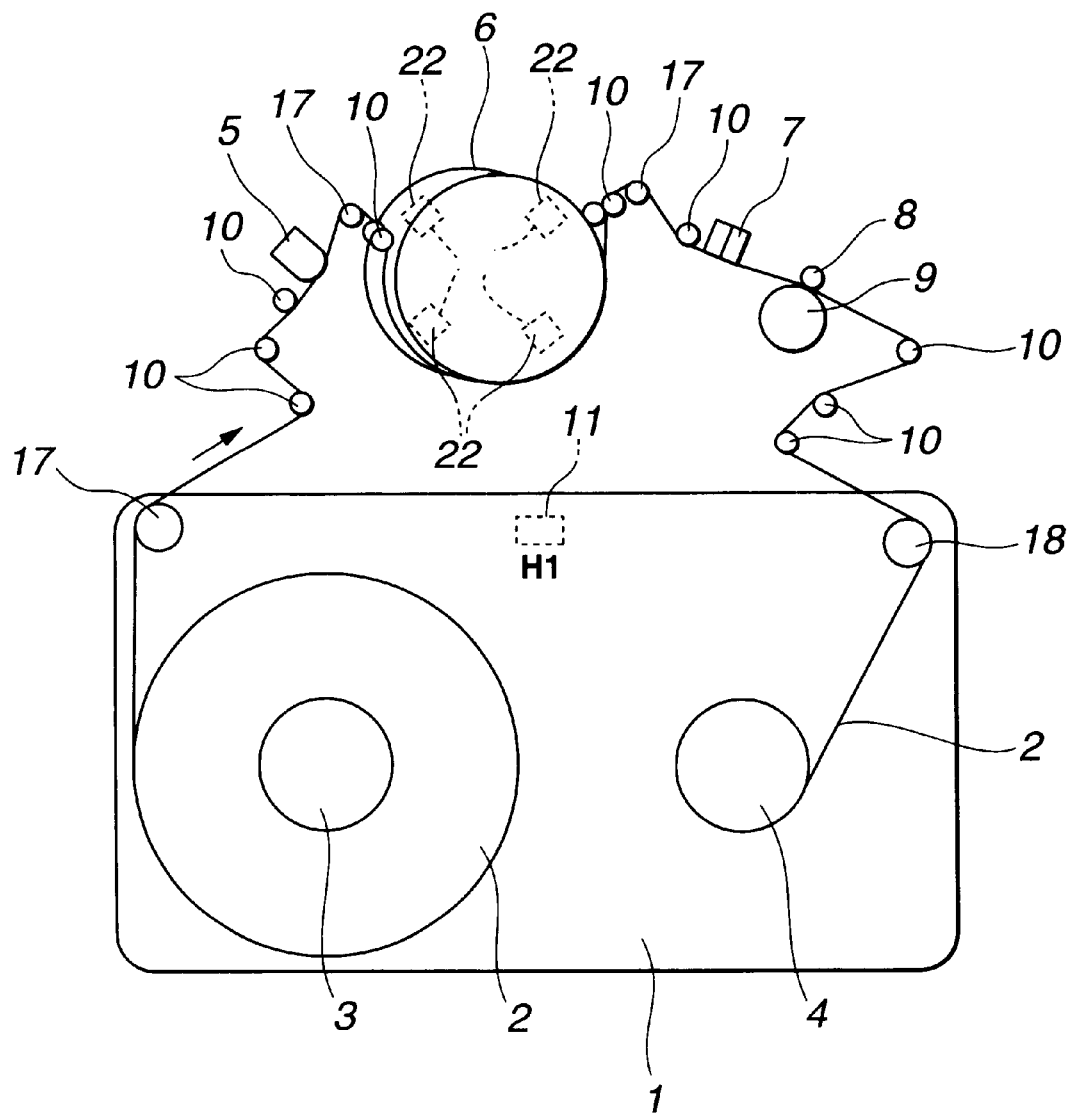
FIG. 1 is a schematic plan view of the essential portions of the magnetic tape recorder/player according to the present invention.

Referring now to FIG. 1, there is schematically illustrated in the form of a plan view the essential portions of the magnetic tape recorder/player according to the present invention. As shown, a tape cartridge 1 has encased therein a magnetic tape 2 is in contact with a drum 6 having a plurality of rotary heads provided thereon. An information signal is written to and/or read from the magnetic tape 2. The information signal can be a digitized signal.

The magnetic tape 2 is fed by an tape loading device (not shown) from a supply reel 3 provided in the tape cartridge 1. The magnetic tape 2 is wound on an erase-all head 5, drum 6, audio/control/erase head 7, etc. at a predetermined angle, and is applied with a driving force applied thereto from a capstan 8 and pinch roller 9 rotated by a driver such as a motor and between which the magnetic tape 2 is threaded and thus made to travel at a constant speed in the direction of arrow in FIG. 1 along a guide way defined by a plurality of tape guides 10. Finally, the magnetic tape 2 is taken upon on a take-up reel 4.

As shown in FIG. 1, a magnetic head 11 dedicated for write or read of magnetic tape position information is disposed movably in a position H1 on the bottom of the tape cartridge 1. The position information-dedicated magnetic head 11 is to be connected to a controller 12 (not shown in FIG. 1).

Figure 2:
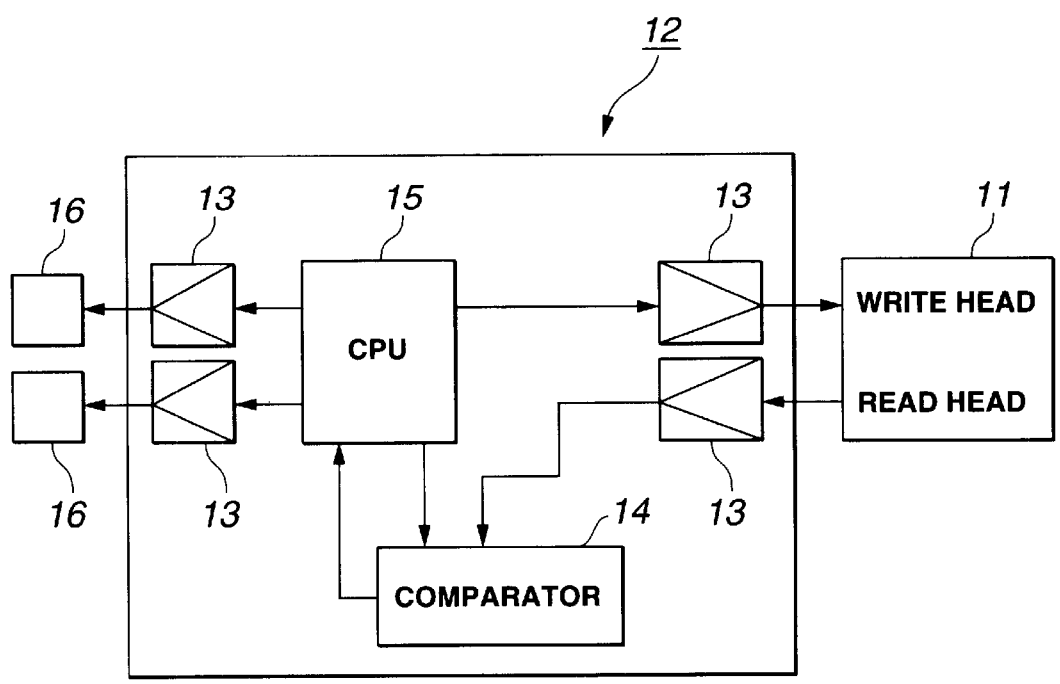
FIG. 2 is a schematic block diagram of the controller of the magnetic tape recorder/player according to the present invention, showing an example construction of the controller.

The controller 12 is provided in the magnetic tape recorder/player. As shown in FIG. 2, the controller 12 includes an A/D converter 13, comparator 14, central processing unit (will be referred to as "CPU" hereafter) 15, etc. In order to write magnetic tape position information, a physical address or a logical address, generated by the CPU 15, is amplified as a binary digital access signal and written to the magnetic tape 2 by the position information-dedicated magnetic head 11. For reading of the magnetic tape position information, the address signal read from the magnetic tape 2 by the magnetic head 11 is amplified for comparison with a reference signal generated by the CPU 15 to control two reel drive motors 16 which drive the supply reel 3 and take-up reel 4, respectively, in order to access the magnetic tape 2.

Figure 3:
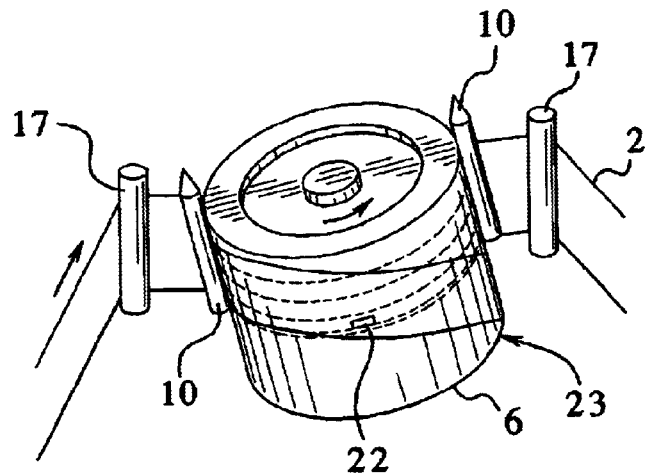
FIG. 3 shows an example construction of the magnetic head and portions near the magnetic head, of the magnetic tape recorder/player according to the present invention.

Referring now to FIG. 3, there is schematically shown an example construction of magnetic head 22 and portions near the magnetic head 22, of the magnetic tape recorder/player according to the present invention. The magnetic head 22 is installed on the drum 6 and forms together with the drum 6 a rotary head 23. Note that in FIG. 2, there is shown only one magnetic head 22 for the simplicity of illustration and description although the rotary head 23 is normally provided with a pair of magnetic heads 22 or more. The rotary head 23 is disposed obliquely in relation to the traveling path of the magnetic tape 2 for helically scanning the magnetic tape 2. Further, tape guides 10 are provided obliquely upstream and downstream, and in the vicinity, of the rotary head 23, and guide rolls 17 are provided upstream and downstream, respectively, of each of the tape guides 10. The magnetic tape 2 travels in the direction of arrow as in FIG. 2 from the supply reel 3 towards the take-up reel 4, and the magnetic head 22 writes or reads an information signal to this traveling magnetic tape 2.

Figure 4:
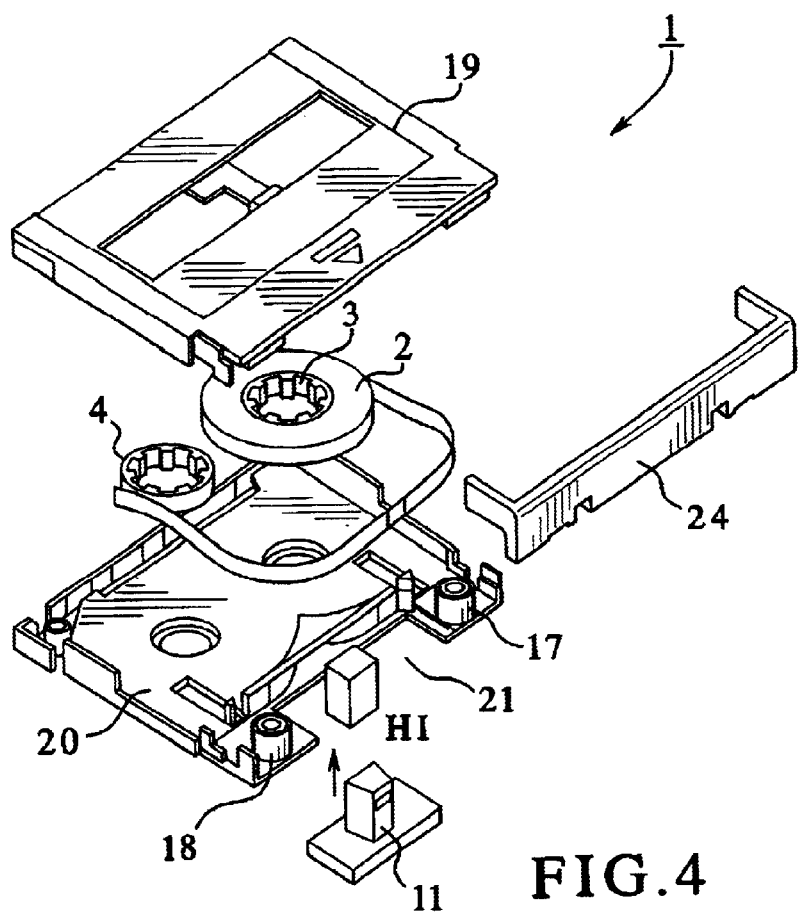
FIG. 4 is a schematic exploded view of an example of the tape cartridge usable in the magnetic tape recorder/player according to the present invention.

Referring now to FIG. 4, there is given a schematic exploded view of an example of the two-reel type tape cartridge 1 usable in the magnetic tape recorder/player according to the present invention. As shown, the tape cartridge 1 consists of an upper half 19 and lower half 20 and has the pair of reels 3 and 4 provided therein. There is formed a tape access opening 21 defined by the upper and lower halves 19 and 20 of the tape cartridge 1. When the magnetic tape 2 is not loaded inside the magnetic tape recorder/player, the tape access opening 21 is closed by a spring-operated lid 24. The magnetic tape 2 is fed from the supply reel 3 to the take-up reel 4, and rewound in the opposite direction. Guide rolls 18 and 18' are provided at opposite ends, respectively, of the tape access opening 21, and the magnetic tape 2 travels over the guide rolls 18 and 18'. As shown, an opening is formed in the lower half 20 of the tape cartridge 1 in the position H1 corresponding to the position which will be taken by the position information-dedicated magnetic head 11 when the tape cartridge 1 is set in place in the magnetic tape recorder/player. Namely, when the tape cartridge 1 is set as in the above, the position information-dedicated magnetic head 11 can be inserted into the opening and into contact with the side of the magnetic tape 2 opposite to that on which the information signal is recorded, and thus can write or read position information of the magnetic tape 2.

The position information-dedicated magnetic head 11 is formed from a combination of a write head and read head. When the tape cartridge is set in place in the magnetic tape recorder/player, it is put in contact with the side of the magnetic tape 2 opposite to that to or from which information signal is written or read, and writes or reads magnetic tape position information to or from that side.

Figure 5:
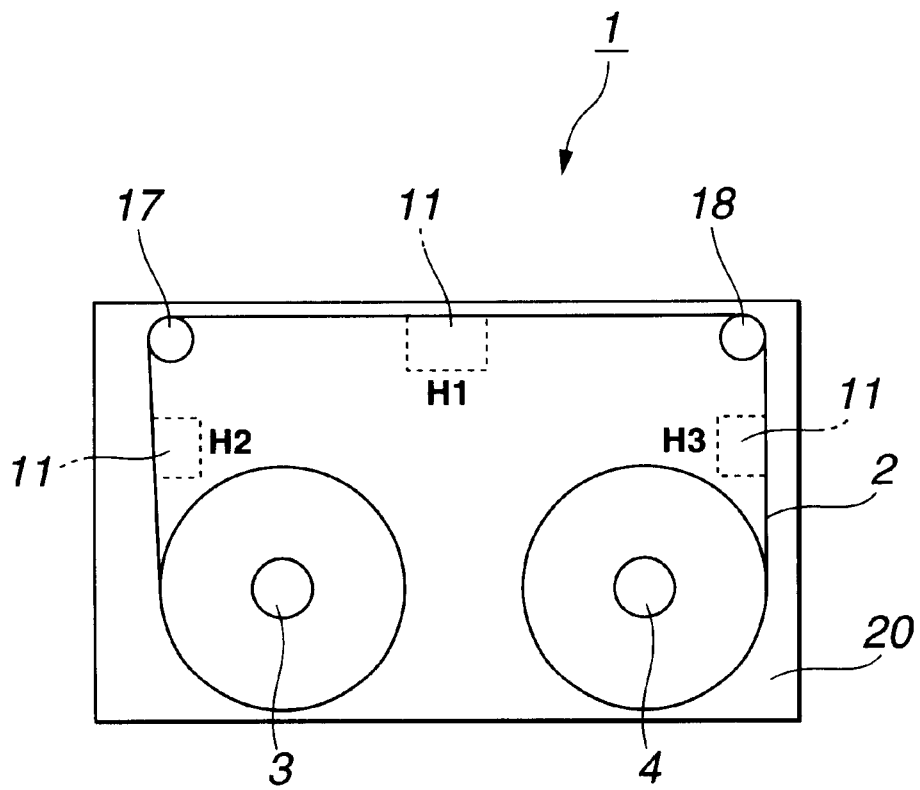
FIG. 5 explains the location of the position information-dedicated magnetic head in relation to the disc cartridge.

The position information-dedicated magnetic head 11 may not be disposed below the position H1 as in FIG. 1, but may be disposed below a predetermined position H2 between the supply reel 3 and guide roll 18 or a predetermined position H3 between the take-up reel 4 and guide roll 18', as shown in FIG. 5 for example. That is, taking in consideration the construction of the magnetic tape recorder/player, the position information-dedicated magnetic head 11 may be disposed in a selected position.

Also, if the position information-dedicated magnetic head 11 is disposed below the position H1, the position information-dedicated magnetic head 11 should be able to write or read position information to or from the magnetic tape 2 loaded in place. In case the position information-dedicated magnetic head 11 is disposed below the position H2 or H3, it can write or read position information to or from the magnetic tape 2 to or from which data is being written or read. That is, for simplification of the construction of the magnetic tape recorder/player, the position information-dedicated magnetic head 11 should preferably be disposed below the position H2 or H3.

Also, the position information-dedicated magnetic head 11 may not consist of the combination of write and read heads as in the above, the write and read heads may be disposed separately. More specifically, the read head may be disposed below the position H1 while the write head may be disposed below the position H2. Alternatively, the read head may be disposed below the position H1 while the write head may be disposed below the position H3. Also, the read head may be disposed below the position H2 while the write head may be disposed below the position H3. Alternatively, the read head may be disposed below the position H3 while the write head may be disposed below the position H2.

Further, the position information-dedicated magnetic head 11 may not be provided on the magnetic tape recorder/player but may be provided on the tape cartridge 1. In the latter case, the position information-dedicated magnetic head 11 is movably disposed in a position corresponding to the above-mentioned position H1, H2 or H3 on the tape cartridge 1. In this case, however, since the position information-dedicated magnetic had 11 has to be connected to the magnetic tape recorder/player, so an opening is formed in the lower half 20 of the tape cartridge 1 in a position opposite to the position information-dedicated magnetic head 11. The magnetic head 11 is connected to the controller 12 of the magnetic tape recorder/player through the opening.

In this case, however, since it is necessary that when the tape cartridge 1 is inserted into the magnetic tape recorder/player, the position information-dedicated magnetic head 11 and magnetic tape recorder/player should be connected to each other simply, securely and quickly, so the position information-dedicated magnetic head 11 should preferably be provided on the magnetic tape recorder/player.

In the above magnetic tape recorder/player, magnetic tape position information is recorded on the side of the magnetic tape 2 opposite to that on which information signal is recorded. For this purpose, a recording layer should be formed on the side of the magnetic tape 2 opposite to that on which information signal is recorded. In this case, however, since only the magnetic tape position information is recorded on the side of the magnetic tape 2 opposite to that on which the information signal is recorded, the recording layer may not be of a high density. So, the recording lay for recording the magnetic tape position information can be formed by mixing a magnetic material in the back-coat layer normally provided on the side of the magnetic tape 2 opposite to that on which the information signal is recorded.

Also, magnetic tape position information may not be recorded on the rear side of the magnetic tape 2 but may be recorded on the front side of the magnetic tape 2 on which information signal is recorded. In this case, an area for recording the position information can be set a part of the recording layer of the magnetic tape 2 on which information signal is recorded, to record the magnetic tape position information on the front side of the magnetic tape 2 on which the information signal is recorded.

Also in this case, the position information-dedicated magnetic head 11 is provided on the magnetic tape recorder/player in such a manner that when the position information-dedicated magnetic head 11 provided on the magnetic tape recorder/player is moved with the tape cartridge 1 set in place in the magnetic tape recorder/player to a position where the magnetic head 11 is put into contact with the surface of the magnetic tape 2, the magnetic tape position information can be written or read to or from the magnetic tape 2.

Next, the magnetic tape recorder/player according to the present invention, constructed as in the above, functions as will be described herebelow:

When the tape cartridge 1 is inserted into place in the magnetic tape recorder/player, the position information-dedicated magnetic head 11 is introduced into the opening formed in the lower half 20 of the tape cartridge 1 in the position corresponding to the position of the position information-dedicated magnetic head 11, and put into contact with the side of the magnetic tape 2 opposite to that on which information signal is recorded. The position information-dedicated magnetic head 11 reads magnetic tape position information from the magnetic tape 2, and the controller 12 recognizes the current position of the magnetic tape 2.

Thereafter, according to an operation command supplied to the magnetic tape recorder/player, information signal is written and/or read from the magnetic tape 2, or the magnetic tape 2 is fast forwarded or rewound. When For write and/ore read of information signal is started, the lid 24 is pivoted by an unlocking lever of an unlocking mechanism of the magnetic tape recorder/player until the magnetic tape 2 is exposed in front of the tape cartridge 1. With the lid 24 pivoted, a tape guide of a tape loading mechanism leads out the magnetic tape 2 from the tape cartridge 1 and threads it over the tape guide 10, drum 6 or capstan 8. This operation is called "tape loading".

When the magnetic tape recorder/player is operated for tape write or read with the tape cartridge 1 thus set, a reel drive shaft is driven to rotate the supply reel 3 clockwise as in FIG. 1 to feed the magnetic tape 2, while the take-up reel 4 is rotated in the clockwise direction as in FIG. 1 to tape up the fed magnetic tape 2. At the same time, the position information-dedicated magnetic head 11 being in contact with the magnetic tape 2 will write or read magnetic tape position information.

When an operation command for fast forward or rewind is issued with the magnetic tape 2 being loaded in place, if there is issued a command for access to a position rear the current position of the magnetic tape, the magnetic tape 2 is fast forwarded or rewound while being loaded in place. When a command for access to a position far from the current position of the magnetic tape 2 is issued, the magnetic tape 2 is unloaded and fast forwarded or rewound while being unloaded out of place.

Since in the magnetic tape recorder/player constructed as in the above, the position information-dedicated magnetic head 11 is provided in the tape cartridge 1, so position information of the magnetic tape 2 can be acquired without the necessity of loading the magnetic tape 2 from the tape cartridge 1 when the tape cartridge 1 is set in the magnetic tape recorder/player.

More particularly, when the tape cartridge 1 is set in the magnetic tape recorder/player according to the present invention, the position information-dedicated magnetic head 11 is introduced from th opening formed in the lower half 20 of the tape cartridge 1 and put into contact with the side of the magnetic tape 2 opposite to that on which information signal is recorded. Thus, the position information-dedicated magnetic head 11 can write or read magnetic tape position information with the magnetic tape being unloaded out of place. Therefore, since the magnetic tape position information can be written or read with the magnetic tape 2 not being loaded, the time taken for loading the magnetic tape 2 for writing or reading the magnetic tape position information can be saved. Namely, access to the magnetic tape 2 can be done more speedily for the saved time for loading the magnetic tape 2.

According to the present invention, since the magnetic tape position information is recorded on the magnetic tape 2, the position of the magnetic tape 2 can be controlled with an extremely high accuracy in comparison with the tape position control by counting the rotating speed of the reel.

If the magnetic tape 2 is fast forwarded or rewound at a high speed with the magnetic tape 2 being loaded, it will be deteriorated. Thus, the fast forward or rewind speed is normally a maximum of 100 times or so higher than the write or read speed. Therefore, in the conventional management of the position information of the magnetic tape 2 with the latter being loaded, when a command for access to a position far from the current position of the magnetic tape 2 is issued for example, a time is taken for the access to the designated position. According to the present invention, however, since the position information of the magnetic tape 2 can be managed while the magnetic tape 2 is being unloaded, so the magnetic tape 2 can be unloaded once and fast forwarded or rewound at a high speed. Since the magnetic tape 2 can be fast forwarded or rewound at a speed about 400 times higher than the write or read speed while it is being unloaded, access to the magnetic tape 2 can be done at a high speed.

As having been described in the foregoing, in the magnetic tape recorder/player according to the present invention, magnetic tape position information is written or read by the position information-dedicated magnetic head with the magnetic tape being unloaded.

Therefore, access to the magnetic tape can be done accurately and rapidly with no deterioration of the magnetic tape.

Also, according the magnetic tape recording/playback method according to the present invention, magnetic tape position information is written or read by the position information-dedicated magnetic head being in contact with the magnetic tape while the magnetic tape is being unloaded inside the magnetic tape recorder/player.

Therefore, accurate and rapid access to the magnetic tape is possible without deterioration of the magnetic tape.

What is claimed is:

1. A magnetic tape recording/playback apparatus for writing and/or reading an information signal to and/or from a magnetic tape encased in a two-reel type tape cartridge, the apparatus comprising:

a position information-dedicated magnetic head dedicated for writing and reading magnetic tape position information to and from the magnetic tape, respectively;

a second magnetic head for transducing said information signal in a helical scanner manner on said magnetic tape;

the tape cartridge having formed therein an opening for said position information-dedicated magnetic head in a position where the opening will be corresponding to the position information-dedicated magnetic head when the tape cartridge is set in place in the magnetic tape recording/playback apparatus.

2. The apparatus as set forth in claim 1, wherein the position information-dedicated magnetic head is disposed in the tape cartridge.

3. The apparatus as set forth in claim 1, wherein the position information-dedicated magnetic head is disposed in the magnetic tape recording/playback apparatus.

4. The apparatus as set forth in claim 1, wherein the magnetic tape position information is written to a side of the magnetic tape opposite to a side to and/or from which the information signal is to be written and/or read.

5. A magnetic tape recording/playback method for writing and/or reading an information signal to and/or from a magnetic tape encased in a two-reel type tape cartridge by a magnetic tape recording/playback apparatus, the method comprising steps of:

setting the tape cartridge in the magnetic tape recording/playback apparatus;

providing an opening in said tape cartridge for a position information-dedicated magnetic head in a position where the opening corresponds to the position information-dedicated magnetic head when the tape cartridge is set in place in the magnetic tape recording/playback apparatus;

placing the position information-dedicated magnetic head dedicated for writing or reading magnetic tape position information in a position where the position information-dedicated magnetic head will be put into contact with the magnetic tape;

placing a second magnetic head for transducing said information signal in a helical scanner manner on said magnetic tape; and writing or reading the magnetic tape position information to or, respectively from the magnetic tape.

6. The method as set forth in claim 5, wherein the magnetic tape position information is written on a side of the magnetic tape opposite a side to on which the information signal of the magnetic tape is written.

7. The method as set forth in claim 5, wherein the magnetic tape position information is written or read by the position information-dedicated magnetic head disposed in the magnetic tape recording/playback apparatus.

8. The method as set forth in claim 5, wherein the magnetic tape position information is written or read by the position information-dedicated magnetic head disposed in the tape cartridge.

* * * * *